United States Patent [19]

Suzuyama et al.

[11] Patent Number: 4,886,316
[45] Date of Patent: Dec. 12, 1989

[54] LUMBAR SUPPORT DEVICE

[75] Inventors: Tomio Suzuyama; Takayuki Kosaka; Masaki Hayama; Tamotsu Shirai, all of Akishima, Japan

[73] Assignee: Tachi-S Co., Ltd., Tokyo, Japan

[21] Appl. No.: 206,367

[22] Filed: Jun. 14, 1988

[30] Foreign Application Priority Data

Jun. 30, 1987 [JP] Japan .............. 62-100645[U]

[51] Int. Cl.⁴ .............................................. A47C 7/46
[52] U.S. Cl. ...................................... 297/284; 297/377
[58] Field of Search .................................. 297/284, 377

[56] References Cited

U.S. PATENT DOCUMENTS

| | | | |
|---|---|---|---|
| 4,162,807 | 7/1979 | Yoshimura | 297/284 |
| 4,556,251 | 12/1985 | Takagi | 297/284 |
| 4,564,235 | 1/1986 | Hatsutta et al. | 297/284 |
| 4,565,406 | 1/1986 | Suzuki | 297/284 |
| 4,588,172 | 5/1986 | Fourrey et al. | 297/284 |
| 4,623,193 | 11/1986 | Lieker | 297/284 |
| 4,715,653 | 12/1987 | Hattori et al. | 297/284 |
| 4,725,095 | 2/1988 | Benson et al. | 297/284 |

FOREIGN PATENT DOCUMENTS 5549 5/1980 Japan .

*Primary Examiner*—Kenneth J. Dorner
*Assistant Examiner*—Brian K. Green
*Attorney, Agent, or Firm*—Browdy and Neimark

[57] ABSTRACT

A lumbar support device provided within a seat back of an automotive seat, which comprises a support wire having a lumbar support plate for supporting the lumbar part of an occupant on the seat, the support wire being mounted on the back frame of the seat back with such an arrangement that one end of the support wire is secured by a securing support member oriented in a direction intersecting that of a load applied to the support wire while the other end of the support wire is secured by another securing support member oriented in a direction intersecting that of an up-and-down adjustment of the support wire.

7 Claims, 2 Drawing Sheets

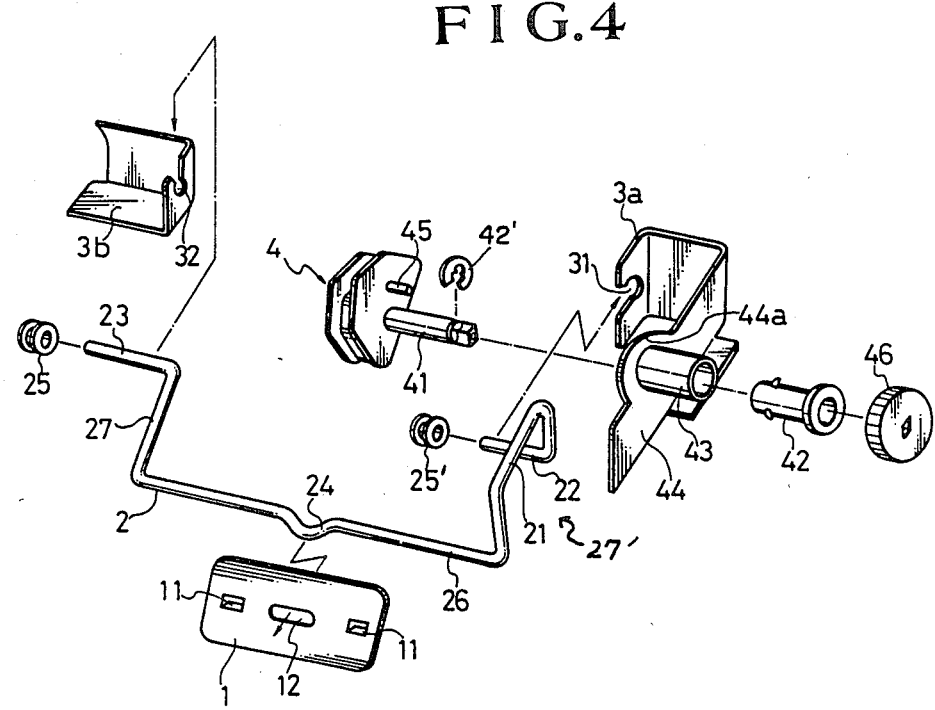
FIG.4
FIG.5
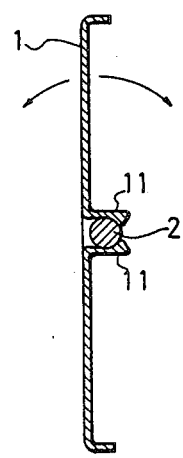
FIG.6
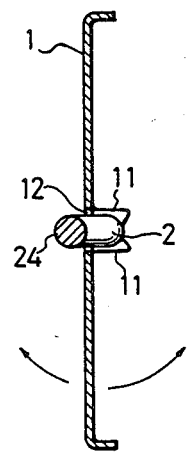

LUMBAR SUPPORT DEVICE

BACKGROUND OF THE INVENTION

1. Field of the Invention

The present invention relates to a lumbar support device built in the seat back of an automotive seat, and is particularly directed to an improved lumbar support device permitting its easy installation in the seat back.

2. Description of the Prior Art

As disclosed in the Japanese Laid-Open Patent Publication No. 55-49, a conventional lumbar support device of this kind is constructed such that a torsion spring having a lumbar plate secured thereto is pivotally and rotatably mounted on a pin or the like. This pin is secured at a bracket fixed on a back frame, and therefore, to effect this pivotal mounting of the torsion spring involves winding one end part of the torsion spring around the pin and fixing the thus-prepared pin to the bracket of the back frame by use of a great number of various tools and machines. This results in a quite poor or slow operation of the seat assembly. What is worse, the structure of such a device is rather complicated, so that many steps of assembling processes are required for producing the device.

SUMMARY OF THE INVENTION

It is therefore a first purpose of the present invention to provide an improved lumbar support device which is simplified in structure and far improved in the requirement for installation in a seat.

For that purpose, in accordance with the invention, there is provided a support wire of substantially π-shaped form, (that is, substantially an inverted U-shaped form) which has a lumbar plate secured in its central portion and has a securing portion extended from each end of the support wire, such that the two securing portions are bent in the same direction. Further, a pair of securing support members are fixedly provided at a back frame. Each of the securing support members have a securing opening so cut out therein as to be oriented in a direction substantially vertically intersecting the direction of a load which is exerted on the securing portions of the support wire towards the securing support members. When assembling the device, the securing portions of the support wire are respectively fitted into the securing openings of the securing support members. The support wire is adjustable in support pressure by displacing its support position by means of an adjustment device such as a cam.

The aforementioned securing openings are further so arranged that one of them is oriented in a direction substantially vertically intersecting the direction of displacement of the support wire effected by the adjustment device, i.e. a cam, while on the other hand, the other of them is oriented in a direction substantially vertically intersecting the direction of a load applied to the support wire (namely, a load applied in a direction identical to that applied to the lumbar plate). Accordingly, the securing portions of the support wire, which form both end sides of the support wire as stated above, are respectively fitted in those two different securing openings, whereby the possibility of the support wire being removed or coming off from the securing support members is eliminated.

It is a second purpose of the present invention to provide an improved lumbar plate in the foregoing lumbar support device, which is far improved in its mounting on the support wire of the device and is changeable in support angle in conformity with the different lumbar contours of an individual occupant on the seat.

To this end, the support wire is formed at its central portion with an outwardly projected curved part of a substantially V-shaped configuration, while the lumbar plate has in its center an aperture perforated for insertion therethrough of the curved part of the support wire and a pair of retaining portions disposed on the opposite sides of the aperture, the retaining portions being adapted to retain the right and left portions of the support wire, whereupon the lumbar plate retained by such support wire is rotatable about the support wire; in other words, the upper and lower halves of the lumbar plate are respectively rotatable forwardly and backwardly about the retaining portions. Accordingly, the support position of the lumbar plate is adjustable to support the lumbar part of an occupant on the seat in the whole surface of the plate.

BRIEF DESCRIPTION OF THE DRAWINGS

FIG. 4 is an exploded perspective view of the lumbar support device;

FIG. 5 is a sectional view taken along the line V—V in the FIG. 1; and

FIG. 6 is a sectional view taken along the line VI—VI in the FIG. 1.

DETAILED DESCRIPTION OF PREFERRED EMBODIMENT OF THE INVENTION

Figure 1:
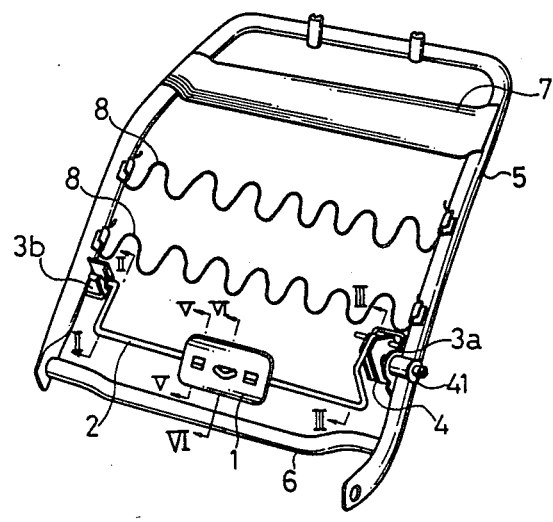
FIG. 1 is a perspective view of a seat framework in which there is provided a lumbar support device in accordance with the present invention.

Referring to FIG. 1, there is illustrated a framework of a seat back to which the present invention is applied.

In the figure, reference numeral (1) designates a lumbar plate which is mounted on a support wire (2). Both ends of the support wire (2) are respectively fitted in a pair of securing support members (3a)(3b) which are fixed on the right and left side sections of a back frame (5). As shown, one side of the support wire (2) is abutted against a cam (4) provided adjacent to the securing support member (3a) having plural discrete surfaces as shown. Accordingly, when an operational knob (46) provided on the free end of a shaft (41) projected externally of the seat back is rotated, the shaft (41) is then rotated to cause the rotation of the cam (4). This causes the surface of the cam (4) to be displaced due to its discrete surfaces, to thereby cause the upward or downward rotation of the support wire (2) about the fitted point where the support wire (2) is fitted in the securing support members (3a)(3b), so that the lumbar plate (1) is moved forwardly and rearwardly relative to the seat back for adjustment of lumbar support pressure against the lumbar portion of an occupant on the seat.

In the FIG. 1, numeral (6) refers to a tubular reinforcing rod extended between the right and left lower portions of the back frame (5), numeral (7) designates a metallic reinforcing plate extended between the right and left upper portions of the same back frame (5), and numerals (8) denote sinuous springs which support a foam cushion member (not shown, and made of an urethane foam, for example).

It is noted that the support wire (2) forming the lumbar support device should be fitted in the securing support members (3a)(3b) at the step of fixing the sinuous springs (8) and the like to the back frame (5).

Hereinafter, the lumbar support device of the present invention will be more specifically described with reference to FIGS. 2 through 6.

The illustrated support wire (2) is made of a steel material and comprises a main body portion (26) having a substantially V-shaped curved part (24) formed in its midway portion, which is projected outwardly thereof, a pair of lateral portions (27)(27') which are both bent and extended from the main body portion (26) at a right angle relative thereto, with such an arrangement that one lateral portion (27') disposed on the left as viewed in FIG. 4 is formed in a substantially inverted U shape, having a cam abutment portion (21) defined on its upper portion, which is in abutment against one of the discrete surfaces of the cam (4), and a pair of securing portions (22)(23), both of them being bent and extended from the respective ends of the lateral portions (27)(27') at a right angle relative thereto in the same direction.

To the main body portion (26), mounted in a rockable manner is the aforementioned lumbar plate (1). Specifically, the lumbar plate (1) has an aperture (12) perforated therein for insertion therethrough of the curved part (24) of the support wire (2), and further has a pair of retaining portions (11)(11) defined on the opposite sides of the aperture (12). Each of the retaining portions (11)(11) is formed by cutting and pressing out the corresponding parts of the lumbar plate (1) to provide upper and lower pressed out pieces which are projected rearwardly of the lumbar plate (1) as best shown in FIGS. 5. Thus, the lumbar plate (1) is rotatably or rockably secured by such retaining portions (11)(11) which hold partially the main body portion (26) therebetween. Accordingly, as seen in FIGS. 5 and 6, the lumbar plate (1) is rotated about the main body portion (26) of the support wire in the arrow directions, so that the upper and lower halves of the lumbar plate (1) are respectively rotated forwardly and backwardly about the main body portion (26), whereupon the lumbar plate (1) is easily adjustable in angle to support in its whole surface the lumbar part of an occupant on the seat.

The cam (4) is fixedly provided at one end of the shaft (41). The shaft (41) is rotatably supported via a bush (42) in a support tube (42) fixed in the hole (not shown) of a bracket (44) welded to the back frame (5), and the other end of the shaft (41), which projects externally of the seat back, namely, back frame, is fixedly provided with an operation knob (46).

The bracket (44) is formed at its upper edge with an arc-shaped guide portion (44a) having its center concentric with that of the shaft (41) as well as the support tube (42). Along such guide portion (44a), a stopper (45) projectingly provided on the cam (4) is in a slidable contact. Then, it is seen that, when rotating the operation knob (46), the stopper (45) is slidingly moved along the guide portion (44a) to rest and stop on either of both bracket's upper edge portions defined on the opposite sides of the guide portion (44a), and, as such, a certain rotation limit of the operation knob is established.

Figure 3:
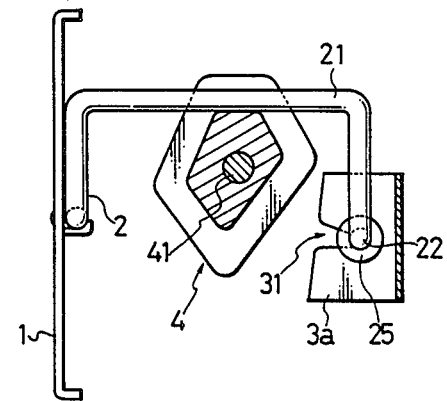
FIG. 3 is a sectional view taken along the line III—III in the FIG. 1.

Integrally formed with such bracket (44) is the securing support member (3a) which is so adapted that the securing portion (22) of the support wire (1) at the abutment portion (21) is fitted therein. The securing support member (3a) is bent from and inwardly of the bracket (44) in a manner representing a generally inverted U shape, with its forward end facing towards the lower part of the seat back, namely, back frame (5). And, as shown in FIG. 3, the securing support member (3a) has a cut-away securing opening (31) formed therein such that the opening (31) is defined by cutting away the member (3a) in an upward direction with respect to the back frame (5). In other words, the securing opening (31) is oriented in a direction substantially vertically intersecting the up-and-down moving direction of the cam abutment portion (21) of the support wire (2) which is produced by displacement action of the cam (4) as stated above.

Figure 2:
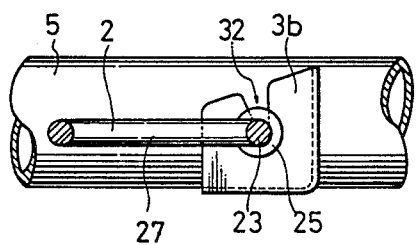
FIG. 2 is a sectional view taken along the line II—II in the FIG. 1.

The other securing support member (3b), in which fitted is the securing portion (23) of the support wire (1) opposed to the above-mentioned first one (22), is formed with a securing opening (32). As best shown in FIG. 2, the securing opening (32) is defined by cutting away the member (3b) in a direction from the front side to the rear side of the back frame (5). In other words, the securing opening (32) is oriented in a direction substantially vertically intersecting the direction of a load applied to the support wire (1).

In the drawings, designations (25)(25') denote collars made of synthetic resin material, which are secured around the securing portions (22)(23), respectively, and further respectively fitted in the securing openings (31)(32), so as to facilitate the smoothness and ease with which the securing portions (22)(23) are rotated at the securing support members (3a)(3b) respectively.

Now, description will be given on the steps of assembling the above-described lumbar support device.

Firstly, simultaneously with the step of welding the reinforcing rod (6), reinforcing plate (7) and other elements to the back frame (5), the bracket (44) integral with the securing support member (3a) and the independent securing support member (3b) are welded to the back frame (5). Next, the projected curved part (24) of the support wire (2) is inserted into the aperture (12) of the lumbar plate (1) and at the same time the main body portion (26) thereof excepting the curved part (24) is inserted into and retained between the retaining portions (11)(11), so that the lumbar support plate (1) is mounted on the support wire (2). Then, the securing portions (22)(23) of the support wire (2) are fitted together with the collars (25)(25) into the securing opening (31) of the securing support member (3a) and the one (32) of the other securing support member (3b), respectively. The cam abutment portion (21) of the support wire (2) is thus in abutment against one of the discrete surfaces of the cam (4). These are only the processes of assembling of the present invention.

Accordingly, from the above description, it will be appreciated that since the securing portions (22)(23) of π-shaped support wire (2), which are oriented in the same direction, are simply fitted in the securing support members (3a)(3b) for assembling the lumbar support device, it is much easier and simpler to mount the lumbar support device to the seat than the conventional devices, which will expedite the assemblage of the device and improve the working efficiency thereof.

Further, the securing portions (22)(23) are fitted in the securing openings (31)(32) oriented in a direction intersecting that of a load exerted on the securing portions. This arrangement prevents the support wire (2) against removal from the securing support members (3a)(3b) in a positive manner without need for any special other securing means.

Still further, all that requires to be machined in the assemblage in accordance with the present invention is to form the foregoing securing portions on the support wire (2) and cut out the securing support members (3a)(3b) to provide the securing openings (31)(32) oriented in a given direction, and therefore, the device per se is extremely simplified in structure with an increased free-from-failure reliability and also it can be supplied at a lower cost.

What is claimed is:

1. A lumbar support device which is provided on a back frame of a seat back of a seat, comprising:
   a support wire of a substantially inverted U-shaped configuration, which has a lumbar plate provided longitudinally and centrally thereof, said support wire being rotatably mounted on said back frame such that the support wire extends between both lateral bar sections of the back frame;
   a pair of securing support members fixedly provided on said lateral bar sections of said back frame, said securing support members being so adapted that end portions of said support wire are respectively fitted in each of them; and
   a cam means arranged adjacent to one of said pair of said securing support members, aid cam means being positioned so as to abut said support wire and adapted for causing upward and downward movement of said support wire by such abutment,
   wherein a pair of securing portions are respectively formed at ends of said support wire, such that they are bent therefrom in a same direction,
   wherein said one of said securing support members disposed at said cam means is formed with means defining a first securing opening which is formed in the securing support member so as to be open in a direction substantially perpendicular to a direction in which said support wire is moved upwardly and downwardly by said cam means,
   wherein the other of said pair of said securing support members is formed with means defining a second securing opening which is formed in the other securing support member so as to open in a direction substantially perpendicular to the opening direction of said first securing opening, and
   wherein said two securing portions of said support wire are respectively fitted in said two securing openings.

2. The lumbar support device according to claim 1, wherein said support wire is made of a steel material and comprises a main body portion having a lumbar plate secured thereon, a pair of lateral portions which are bent and extended from said main body portion in a same direction at a right angle relative thereto, with such an arrangement that one of said lateral portions is formed in a substantially inverted U shape, having a cam abutment portion defined therein which is abutted against said cam means, and a pair of securing portions which are bent and extended from respective ends of said lateral portions in a same direction at a right angle relative thereto.

3. The lumbar support device according to claim 2, wherein said support wire is formed in its midway portion of said main body portion thereof with an outwardly projected curved part of a substantially V shape, wherein said lumbar plate has an aperture perforated in its central portion, said aperture being adapted for insertion therethrough of said outwardly projected curved part of said support wire, and wherein said lumbar plate further includes a pair of retaining portions formed therein such that they are disposed symmetrically relative to said aperture and each of them is formed by cutting and pressing out a corresponding part of said lumbar plate to provide upper and lower pressed-out pieces rearwardly of said lumbar plate, said retaining portions being adapted to receive said support wire excepting said outwardly curved part in such a manner that said upper and lower pressed-out pieces of each of said retaining portions hold therebetween said support wire excepting said curved part, whereby said lumbar plate are rotatable about said support wire such that upper and lower halves of said lumbar plate are respectively rotated forwardly and backwardly relative to said support wire.

4. The lumbar support device according to claim 1, wherein said cam means includes a stopper projected thereon and a shaft projectingly provided therewith, said shaft being at its free end provided with an operation knob, wherein said one of said securing support members is formed integrally with a bracket which is fixed on said back frame, including a means for insertion therethrough of said shaft of said cam means and an arc-shaped portion formed in its upper edge, and wherein said stopper of said cam member is in a slidable contact with said arc-shaped portion of said bracket, thereby providing a rotation limit of said operation knob.

5. The lumbar support device according to claim 1, wherein said pair of securing portions of said support wire are each provided with a collar made of synthetic resin material, and wherein said securing portions are fitted together with said collars in said securing openings of said securing support members, respectively, so as to permit an easy and smooth rotation of said support wire relative to said securing support members.

6. The lumbar support device according to claim 4, wherein said one of said securing support members integral with said bracket is bent from and inwardly of said bracket in a manner representing a generally inverted U shape, with its forward end facing towards the lower part of said back frame.

7. The lumbar support device according to claim 1, wherein said securing opening of said one of said securing support members is oriented in a direction towards a lower part of said back frame whereas said other of said securing support members is oriented in a direction towards a front side of said back frame.

* * * * *